UNITED STATES PATENT OFFICE.

CHARLES A. CATLIN, OF PROVIDENCE, RHODE ISLAND, ASSIGNOR OF ONE-HALF TO CORNELIUS S. SWEETLAND, OF SAME PLACE.

SULPHITE SOLUTION FOR WOOD PULP.

SPECIFICATION forming part of Letters Patent No. 366,153, dated July 5, 1887.

Application filed April 23, 1886. Serial No. 199,945. (No specimens.)

*To all whom it may concern:*

Be it known that I, CHARLES A. CATLIN, of Providence, in the county of Providence and State of Rhode Island, have invented a new and useful Improvement in the Production of Sulphurous-Acid and Acid-Sulphite Solutions in the Manufacture of Paper-Pulp, which improvement is fully set forth in the following specification.

This invention has reference to the production of sulphurous-acid and acid-sulphite solutions for use in the manufacture of paper-pulp from wood.

Heretofore in the manufacture of wood pulp by the sulphite or sulphurous-acid process it has been customary to prepare the liquid by absorption of sulphurous-acid gas in suitable vessels and to add it to the wood in the digester.

The present invention consists in the preparation of a suitable acid-sulphite solution in the digester by the introduction thereinto with the wood and water of a neutral sulphite and a decomposing acid.

In carrying the invention into effect the digester is charged with the chips, water, and dry monosulphite salt, and then a decomposing acid is run in. The materials are employed in quantities to give an acid sulphite solution of suitable strength. Sulphite of the bases commonly employed as acid sulphites may be used, and sulphuric or hydrochloric acid is suitable for decomposing the same. The said acid may be employed in such proportion as to neutralize half of the base of the sulphite, thus forming a bisulphite, or the proportions may be altered.

It will be understood that the invention is not limited to the neutral sulphite of any particular base or bases, nor to any particular decomposing acid, only the production of an objectionable salt as the result of the decomposition should be avoided. If a neutral sulphite of calcium or of potassium be decomposed with sulphuric or hydrochloric acid, the salt formed is not objectionable. The invention is also not restricted to any particular proportions. They may be varied according to the judgment or skill of the paper-maker. One advantage over the ordinary process is that of avoiding the necessity for any special apparatus outside of the digester. The dry neutral or mono sulphites can be readily shipped to be used as may be required.

I claim as my invention—

The improvement in making paper-pulp, consisting in charging the digester with the wood and a neutral sulphite and adding a decomposing acid—such, for example, as sulphuric or hydrochloric acid—thereto, substantially as described.

In testimony whereof I have signed this specification in presence of two subscribing witnesses.

CHAS. A. CATLIN.

Witnesses:
 BENJN. N. LOPHEM,
 LOUIS L. ANGELL.